(12) United States Patent
Wu et al.

(10) Patent No.: US 12,413,405 B2
(45) Date of Patent: Sep. 9, 2025

(54) ENCRYPTION DEVICE AND ENCRYPTION METHOD WITH CLOCK GATING UNIT AND RANDOM-NUMBER GENERATOR

(71) Applicant: Nuvoton Technology Corporation, Hsinchu (TW)

(72) Inventors: Kun-Yi Wu, Tainan (TW); Yu-Shan Li, Tainan (TW)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 248 days.

(21) Appl. No.: 17/983,716

(22) Filed: Nov. 9, 2022

(65) Prior Publication Data

US 2023/0327867 A1   Oct. 12, 2023

(30) Foreign Application Priority Data

Apr. 11, 2022   (TW) .................................. 111113583

(51) Int. Cl.
*H04L 9/08* (2006.01)

(52) U.S. Cl.
CPC .................................. *H04L 9/0869* (2013.01)

(58) Field of Classification Search
None
See application file for complete search history.

(56) References Cited

U.S. PATENT DOCUMENTS

| | | | |
|---|---|---|---|
| 10,572,619 B2 | 2/2020 | Levi et al. | |
| 2018/0307864 A1* | 10/2018 | Moss | ..................... H04L 9/003 |
| 2021/0194667 A1 | 6/2021 | Stark | |

FOREIGN PATENT DOCUMENTS

| | | | | |
|---|---|---|---|---|
| CN | 113364574 A | 9/2021 | | |
| EP | 3171290 A1 * | 5/2017 | ........... | G06F 21/755 |
| TW | 201820200 A | 6/2018 | | |
| TW | 202021276 A | 6/2020 | | |
| TW | 202131207 A | 8/2021 | | |
| WO | WO-2017037725 A1 * | 3/2017 | ............ | G06F 21/72 |
| WO | WO-2018090931 A1 * | 5/2018 | ............... | G06F 1/08 |

OTHER PUBLICATIONS

Benini et al., "Energy-Aware Design Techniques for Differential Power Analysis Protection," Proceedings of the 40th Annual Design Automation Conference, Jun. 2-6, 2003, Anaheim, California, pp. 36-41, 7 pages.

Taiwanese Office Actions dated May 8, 2023 corresponding to application No. 111113583; pp. 1-14.

* cited by examiner

*Primary Examiner* — Benjamin E Lanier
(74) *Attorney, Agent, or Firm* — MUNCY, GEISSLER, OLDS & LOWE, P.C.

(57) ABSTRACT

An encryption device is provided, which includes a controller, a random controller, a first functional unit, and a second functional unit. The controller generates a first enable signal and a second enable signal. When at least one of the first enable signal and the second enable signal is in a first logic level, the random controller generates a first random signal and a second random signal. The first functional unit performs the corresponding operation according to the first enable signal and the first random signal. The second functional unit performs the corresponding operation according to the second enable signal and the second random signal.

17 Claims, 6 Drawing Sheets

ENCRYPTION DEVICE AND ENCRYPTION METHOD WITH CLOCK GATING UNIT AND RANDOM-NUMBER GENERATOR

CROSS REFERENCE TO RELATED APPLICATIONS

This Application claims priority of Taiwan Patent Application No. 111113583, filed on April 11, 2022, the entirety of which is incorporated by reference herein.

BACKGROUND OF THE INVENTION

Field of the Invention

The disclosure is generally related to an encryption device and an encryption method, and more particularly it is related to an encryption device and an encryption method implemented by a clock gating unit and a random-number generator.

Description of the Related Art

As IoT (Internet of Things) devices are unattended most of the time, they are easy targets for hacking. The importance of physical security for IoT devices increases accordingly. Side-Channel Attacks (SCA) exploit the device's physical characteristics, such as power, electromagnetic waves, temperature, etc., to reveal the secret key and the information about the target device. Therefore, how to prevent important information from being stolen by a power analysis is a very important issue today.

BRIEF SUMMARY OF THE INVENTION

The present invention provides an encryption device and an encryption method. By using a clock gating unit and a method of random-number generation, any functional units that are not performing operations are randomly enabled, thereby disturbing the power traces of the encryption device. Furthermore, the encryption device and the encryption method provided by the present invention are very simple and can be realized without a background in cryptography. In addition, when the power traces of an encryption device need to be increased, the original functional unit can be subdivided into several smaller hardware modules that can be individually inserted into the clock gating unit, so that the complexity of the power traces may be easily improved. On the whole, the encryption device and encryption method provided by the present invention may achieve the possibility of more power traces to improve the security of encryption with a minimal cost.

In an embodiment, an encryption device comprises a controller, a random controller, a first functional unit, and a second functional unit. The controller is configured to generate a first enable signal and a second enable signal. When at least one of the first enable signal and the second enable signal is at a first logic level, the random controller generates a first random signal and a second random signal. The first functional unit performs a corresponding operation according to the first enable signal and the first random signal. The second functional unit performs a corresponding operation according to the second enable signal and the second random signal.

According to an embodiment of the invention, the encryption device further comprises a first clock gating unit and a second clock gating unit. The first clock gating unit generates a first internal clock signal according to the first enable signal, the first random signal, and a system clock signal. The first functional unit further performs the corresponding operation according to the first internal clock signal. The second clock gating unit generates a second internal clock signal according to the second enable signal, the second random signal, and the system clock signal. The second functional unit further performs the corresponding operation according to the second internal clock signal.

According to an embodiment of the invention, the encryption device further comprises a third clock gating unit and a third functional unit. The third clock gating unit generates a third internal clock signal according to a third enable signal, a third random signal, and the system clock signal. The third functional unit performs a corresponding operation according to the third internal clock signal. The controller is further configured to generate the third enable signal. When at least one of the first enable signal, the second enable signal, and the third enable signal is at the first logic level, the random controller generates the first random signal, the second random signal, and the third random signal.

According to an embodiment of the invention, when the first enable signal is at the first logic level, the first functional unit is enabled to perform the corresponding operation and the random controller generates the first random signal, the second random signal, and the third random signal, so that the second functional unit and the third functional unit are randomly enabled according to the second random signal and the third random signal respectively to disturb the power trace of the encryption device.

According to an embodiment of the invention, each of the first clock gating unit, the second clock gating unit, and the third clock gating unit comprises an OR gate and an AND gate. The OR gate receives an enable signal and a random signal to generate a logic signal. The AND gate outputs the system clock signal as an internal clock signal according to the logic signal.

According to an embodiment of the invention, the random controller comprises a random-number controller and a random-number generator. The random-number controller determines whether any of the enable signals (i.e., the first enable signal, the second enable signal, and the third enable signal) is at the first logic level. When any of enable signals (i.e., the first enable signal, the second enable signal, and the third enable signal) is at the first logic level, the random-number controller generates a determination signal. The random-number generator generates a first random-number, a second random-number, and a third random number according to the determination signal and the system dock signal.

According to an embodiment of the invention, the random-number generator again generates the first random-number, the second random-number, and the third random-number after a predetermined period. The predetermined period is an integer multiple of the period of the system clock signal.

According to an embodiment of the invention, the random controller further comprises a first AND gate, a second AND gate, and a third AND gate. The first AND gate receives the determination signal and the first random number to generate the first random signal. The second AND gate receives the determination signal and the second random number to generate the second random signal. The third AND gate receives the determination signal and the third random number to generate the third random signal.

According to another embodiment of the invention, the random controller further comprises a first AND gate, a second AND gate, and a third AND gate. The first AND gate receives a first random-number control signal and the first random-number to generate the first random signal. The second AND gate receives a second random-number control signal and the second random-number to generate the second random signal. The third AND gate receives a third random-number control signal and the third random-number to generate the third random signal. The random-number controller further generates the first random-number control signal, the second random-number control signal, and the third random-number control signal to control whether to output any of the first random-number, the second random-number, and the third random-number.

In another embodiment, an encryption method adapted to an encryption device is provided. The encryption device comprises a first functional unit and a second functional unit. The encryption method comprises generating a first enable signal to enable the first functional unit, wherein the first enable signal is at a first logic level; generating a first random signal and a second random signal according to the first enable signal at the first logic level; and randomly enabling a second functional unit by the second random signal.

According to an embodiment of the invention, the encryption device further comprises a first clock gating unit and a second clock gating unit. The encryption method further comprises generating a first internal clock signal according to the first enable signal, the first random signal, and a system clock signal by using the first clock gating unit; enabling the first functional unit by using the first internal clock signal; generating a second internal clock signal according to a second enable signal, the second random signal, and the system clock signal by using the second clock gating unit; and enabling the second functional unit by using the second internal clock signal.

According to an embodiment of the invention, the encryption device further comprises a third functional unit. The encryption method further comprises generating a third random signal according to the first enable signal at the first logic level; and randomly enabling the third functional unit by using the third random signal.

According to an embodiment of the invention, the encryption device further comprises a third clock gating unit. The encryption method further comprises generating a third internal clock signal according to a third enable signal, the third random signal, and the system clock signal by using the third clock gating unit; and enabling the third functional unit by using the third internal clock signal.

According to an embodiment of the invention, the step of generating the first internal clock signal according to the first enable signal, the first random signal, and the system clock signal by using the first clock gating unit, the step of generating the second internal clock signal according to the second enable signal, the second random signal, and the system clock signal by using the second clock gating unit, and the step of generating the third internal clock signal according to the third enable signal, the third random signal, and the system dock signal by using the third clock gating unit each further comprises performing a logic OR operation on an enable signal and a random signal to generate a logic signal; outputting the system dock signal as art internal dock signal according to the logic signal; and enabling a corresponding functional unit according to the internal clock signal.

According to an embodiment of the invention, in the step of generating the first random signal, the second random signal, and the third random signal according to the first enable signal at the first logic level, when any of the first enable signal, the second enable signal, and the third enable signal is at the first logic level, a determination signal is generated by using a random-number controller. A first random-number, a second random-number, and a third random-number are generating according to the determination signal and the system clock signal.

According to an embodiment of the invention, a first random number, a second random number, and a third random number are generated again after the predetermined period, wherein the predetermined period is an integer multiple of the period of the system clock signal.

According to an embodiment of the invention, the step of generating the first random signal, the second random signal, and the third random signal according to the determination signal and the system clock signal further comprises performing a logic AND operation on the determination signal and the first random number to generate the first random signal; performing the logic AND operation on the determination signal and the second random number to generate the second random signal; and performing the logic AND operation on the determination signal and the third random number to generate the third random signal.

According to another embodiment of the invention, the step of generating the first random signal, the second random signal, and the third random signal according to the determination signal and the system clock signal further comprises generating a first random-number control signal, a second random-number control signal, and a third random-number control signal by using a random-number controller; performing a logic AND operation on the first random-number control signal and the first random number to generate the first random signal; performing the logic AND operation on the second random-number control signal and the second random number to generate the second random signal; and performing the logic AND operation on the third random-number control signal and the third random number to generate the third random signal.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
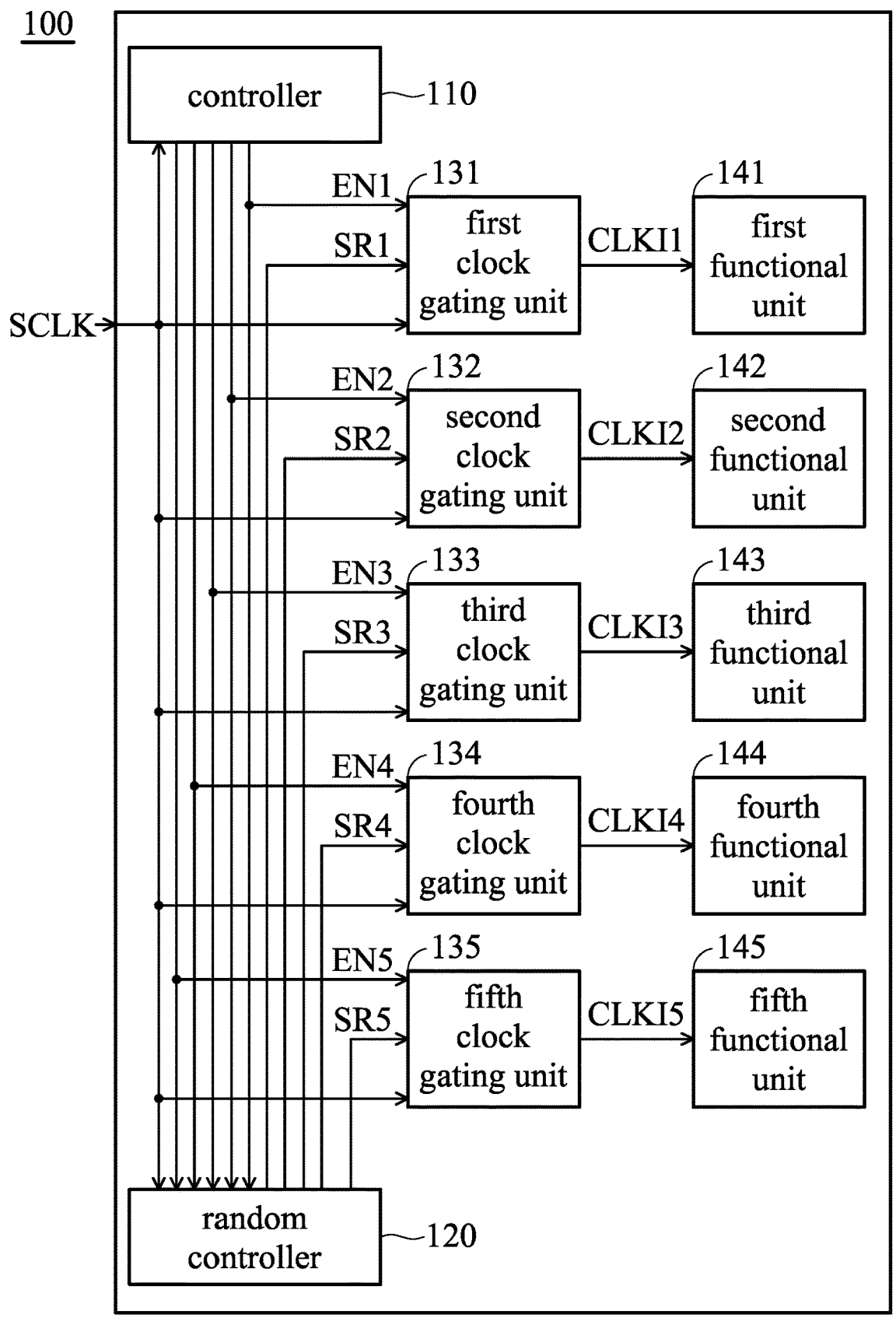
FIG. 1 is a block diagram showing an encryption device in accordance with an embodiment of the present invention.

This description is made for the purpose of illustrating the general principles of the invention and should not be taken in a limiting sense. In addition, the present disclosure may repeat reference numerals and/or letters in the various examples. This repetition is for the purpose of simplicity and clarity and does not in itself dictate a relationship between the various embodiments and/or configurations discussed. The scope of the invention is best determined by reference to the appended claims.

It would be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It is understood that the following disclosure provides many different embodiments, or examples, for implementing different features of the application. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact.

FIG. 1 is a block diagram illustrating an encryption device in accordance with an embodiment of the present invention. As shown in FIG. 1, the encryption device 100 includes a controller 110 and a random controller 120. The controller 110 is configured to generate a first enable signal EN1, a second enable signal EN2, a third enable signal EN3, a fourth enable signal EN4, and a fifth enable signal FN according to the system clock signal SCLK.

The random controller 120 generates a first random signal SR1, a second random signal SR2, a third random signal SR3, a fourth random signal SR4, and a fifth random signal SR5 according to the system clock signal SCLK, the first enable signal ENI, the second enable signal EN2, the third enable signal EN3, the fourth enable signal EN4, and the fifth enable signal EN5. According to an embodiment of the present invention, when the first enable signal EN1, the second enable signal EN2, the third enable signal EN3, the fourth enable signal EN4, and the fifth enable signal EN5 is at a first logic level, the random controller 120 generates a first random signal SR1, a second random signal SR2, a third random signal SR3, a fourth random signal SR4, and a fifth random signal SR5. According to an embodiment of the present invention, the first logic level is a high logic level. According to another embodiment of the present invention, the first logic level may also be a low logic level. The first logic level is illustrated as a high logic level for illustration and explanation in the following paragraphs, but it is not intended to be limited thereto.

As shown in FIG. 1, the encryption device 100 further includes a first clock gating unit 131, a second clock gating unit 132, a third clock gating unit 133, and a fourth clock gating unit 134, and a fifth clock gating runt 135. The first clock gating unit 131 generates a first internal clock signal CLKI1 according to the first enable signal ENI, the first random signal SRI, and the system clock signal SCLK. The second clock gating unit 132 generates the second internal clock signal CLKI2 according to the second enable signal EN2, the second random signal SR2, and the system clock signal SCLK.

The third clock gating unit 133 generates a third internal dock signal CLKI3 according to the third enable signal EN3, the third random signal SR3, and the system clock signal SCLK. The fourth clock gating unit 134 generates a fourth internal clock signal CLKI4 according to the fourth enable signal EN4, the fourth random signal SR4, and the system clock signal SCLK. The fifth clock gating unit 135 generates a fifth internal clock signal CLKI5 according to the fifth enable signal EN5, the fifth random signal SR5, and the system clock signal SCLK.

As shown in FIG. 1, the encryption device 100 further includes a first functional unit 141, a second functional unit 142, a third functional unit 143, a fourth functional unit 144, and a fifth functional unit 145. The first functional unit 141, the second functional unit 142, the third functional unit 143, the fourth functional unit 144, and the fifth functional unit 145 perform corresponding operations according to the first internal clock signal CLKI1, the second internal clock signal CLKI2, the third internal clock signal CLKI3, the fourth internal clock signal CLKI4, and the fifth internal clock signal CLKI5.

According to many embodiments of the present invention, any of the functional units (i.e., the first functional unit 141, the second functional unit 142, the third functional unit 143, the fourth functional unit 144, and the fifth functional unit 145) may be a Data Encryption Standard (DES), International Data Encryption Algorithm (IDEA), Advanced Encryption Standard (AES), Triple DES, and so on. According to other embodiments of the present invention, any of the aforementioned functional units (i.e., the first functional unit 141, the second functional unit 142, the third functional unit 143, the fourth functional unit 144, and the fifth functional unit 145) may also be a known or unknown analog or digital circuit.

According to some embodiments of the present invention, the encryption device 100 may include more encryption units, thereby further disturbing the power trace of the encryption device 100, so that the data processed by the encryption device 100 is further protected. According to some embodiments of the present invention, the functional units may be subdivided into smaller functional units (e.g., adders, logic gates, etc.), thereby increasing the possibility and complexity of the power traces of the encryption device 100. According to other embodiments of the present invention, the encryption device 100 may also include any number of functional units, and only five functional units are illustrated for explanation herein, but it is not intended to be limited thereto.

According to an embodiment of the present invention, when the random controller 120 determines that the first enable signal EN1 is at the first logic level, the first functional unit 141 performs corresponding operations according to the first enable signal EN1. At the same time, the random controller 120 generates the first random signal SR1, the second random signal SR2, the third random signal SR3, the fourth random signal SR4, and the fifth random signal SR5, so that the second functional unit 142, the third functional unit 143, the fourth functional unit 144, and the fifth functional unit 145 are randomly enabled, thereby disturbing the power traces of the encryption device 100.

For example, when the controller 110 enables the first functional unit 141 through the first enable signal EN1, the random controller 120 can enable the second function unit 141 and the fourth functional unit 144 by enabling the second random signal SR2 and the fourth random signal SR4 respectively, and enable the fifth functional unit 145 by the fifth random signal SR5 after the predetermined period. According to an embodiment of the present invention, the predetermined period is an integer multiple of the period of the system clock signal SCLK. In other words, the random controller 120 may also update the generated first random signal SR1, second random signal SR2, third random signal SR3, fourth random signal SR4, and fifth random signal SR5 after each predetermined period, and then randomly enable different functional units.

According to an embodiment of the present invention, the functional units enabled by the enable signals are not affected by the corresponding random signals. In the above-mentioned embodiment, since the first functional unit 141 is enabled by the first enable signal EN1, the first functional unit 141 is not affected by the first random signal SR1 and operates normally.

In detail, the first functional unit 141, the second functional unit 142, the third functional unit 143, the fourth functional unit 144, and the fifth functional unit 145 are enabled by enabling the first enable signals EN1, the second. The enable signal EN2, the third enable signal EN3, the fourth enable signal EN4, and the fifth enable signal EN5. respectively, and perform corresponding operations according to the system clock signal SCLK. In addition, any of the first functional unit 141, the second functional unit 142, the third functional unit 143, the fourth functional unit 144, and the fifth functional unit 145 that is not enabled may be randomly enabled by the first random signal SR1, the second random signal SR2, the third random signal SR3, the fourth random signal SR4, and/or the fifth random signal SR5, which are randomly enabled to disturb the power trace of the encryption device 100.

Figure 2:
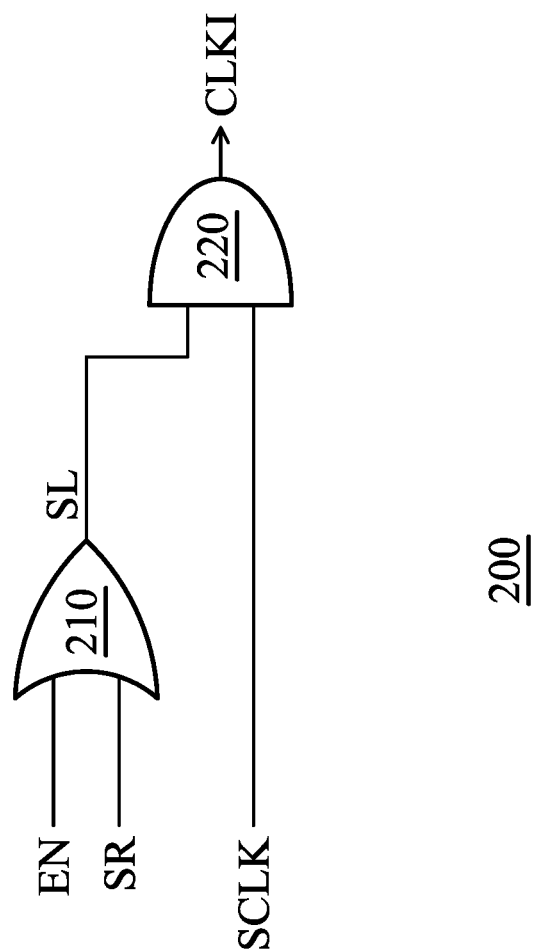
FIG. 2 is a block diagram illustrating a clock gating unit in accordance with an embodiment of the present invention.

FIG. 2 is a block diagram illustrating a clock gating unit in accordance with an embodiment of the present invention. As shown in FIG. 2, the clock gating unit 200 further includes an OR gate 210 and an AND gate 220. According to an embodiment of the present invention, the clock gating unit 200 corresponds to any of the first clock gating unit 131, the second clock gating unit 132, the third clock gating unit 133, the fourth clock gating unit 134, and the fifth clock gating unit 135 depicted in FIG. 1.

The OR gate 210 receives the enable signal EN and the random signal SR, and performs a logical OR operation on the enable signal EN and the random signal SR to generate a logic signal SL. According to an embodiment of the present invention, the enable signal EN in FIG. 2 may correspond to any of the enable signals (i.e., the first enable signal EN1, the second enable signal EN2, the third enable signal EN3, the fourth enable signal EN4, and the fifth enable signals EN5) in FIG. 1. Moreover, the random signal SR in FIG. 2 may correspond to any of the random signals (i.e., the first random signal SR1, the second random signal SR2, the third random signal SR3, the fourth random signal SR4, and the fifth random signal SR5).

The AND gate 220 receives the logic signal SL and the system clock signal SCLK, and performs a logical AND operation on the logic signal SL and the system clock signal SCLK to generate an internal clock signal CLKI. In other words, when the logic signal SL is at a high logic level, the AND gate 220 outputs the system clock signal SCLK as the internal clock signal CLKI.

According to an embodiment of the present invention, the internal clock signal CLKI in FIG. 2 corresponds to the first internal clock signal CLKI1, the second internal clock signal CLKI2, and the third internal clock signal CLKI3, the fourth internal clock signal CLKI4, and the fifth internal clock signal CLKI5 in FIG. 1.

As shown in FIG. 2, since the enable signal EN and the random signal SR pass through the OR gate 210 to generate a logic signal SL provided to the AND gate 220, it represents one of the functional units (i.e., the first functional unit 141, the second functional unit 142, the third functional unit 143, the fourth functional unit 144, and the fifth functional unit 145) depicted in FIG. 1 being enabled according to the enable signal EN and/or the random signal SR. In other words, when the functional unit is enabled by the enable signal EN, the enabled functional unit may be affected by the random signal SR and operate normally, and the enable signal EN and random signal SR may each independently enable the corresponding functional unit.

For example, in the above-mentioned embodiment, the first functional unit 141 is enabled by the first enable signal EN1. Even if the random controller 120 generates the first random signal SR1 at the same time, the first functional unit 141 is still enabled due to the first enable signal EN1 in an enabled state, which may be affected by the first random signal SR1.

Figure 3:
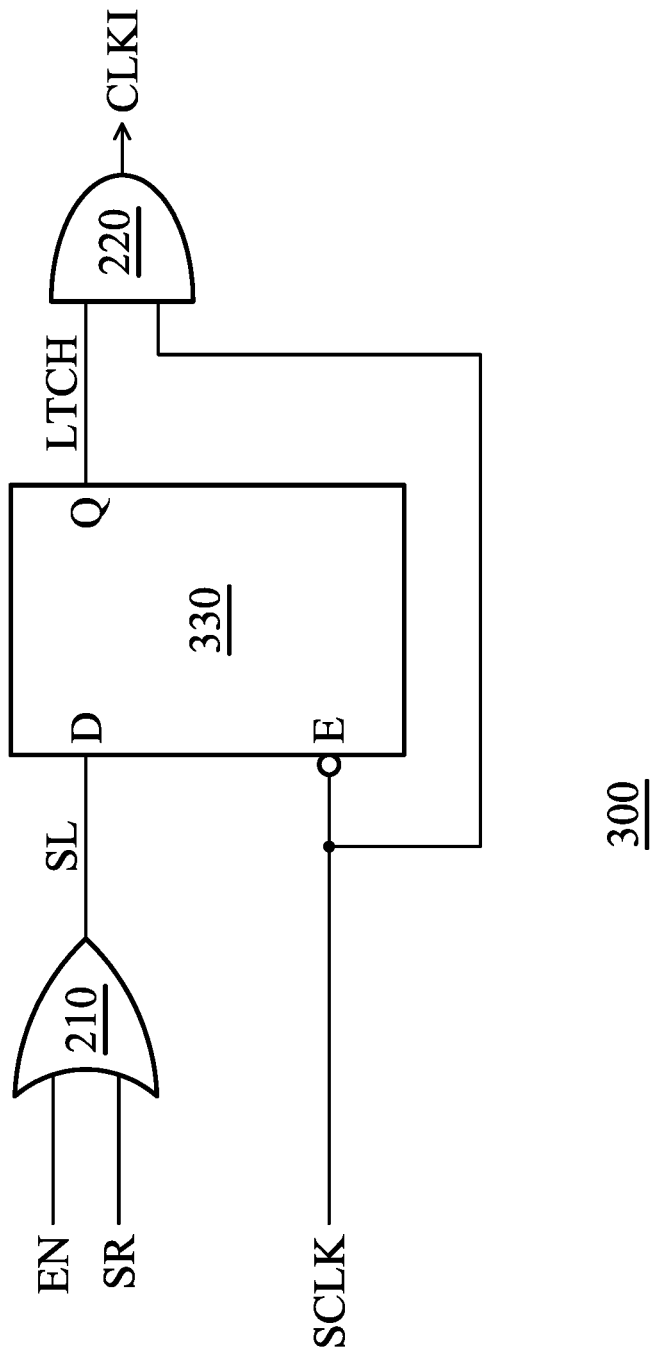
FIG. 3 is a block diagram illustrating a clock gating unit in accordance with another embodiment of the present invention.

FIG. 3 is a block diagram illustrating a clock gating unit in accordance with another embodiment of the present invention. Comparing the clock gating unit 300 of FIG. 3 with the clock gating unit 200 of FIG. 2, the clock gating unit 300 further includes a D-type flip-flop 330, in which the D-type flip-flop 330 is coupled between the OR gate 210 and the AND gate 220. According to an embodiment of the present invention, the clock gating unit 300 corresponds to any of the first clock gating unit 131, the second clock gating unit 132, the third clock gating unit 133, the fourth clock gating unit 133, the fourth clock gating unit 134, and the fifth clock gating unit 135 illustrated in FIG. 1.

As shown in FIG. 3, the D-type flip-flop 330 includes an input terminal D, a trigger terminal E, and an output terminal Q, in which the input terminal D receives the logic signal SL, the trigger terminal E receives the system clock signal SCLK, and the output terminal Q outputs the latch signal LTCH. As shown in FIG. 3, the D-type flip-flop 330 is triggered by the falling edge of the system clock signal SCLK to latch the logic signal SL for one period of the system clock signal SCLK, and then outputs the latch signal LTCH.

The AND gate 220 receives the latch signal LTCH and the system clock signal SCLK, and performs a logical AND operation on the latch signal LTCH and the system dock signal SCLK to generate an internal clock signal CLKI. According to an embodiment of the present invention, when the latch signal LTCH and the system clock signal SCLK are both at the high logic level, the internal clock signal CLKI generated by the AND gate 220 is at the high logic level. According to an embodiment of the present invention, the internal clock signal CLKI in FIG. 3 corresponds to any of the first internal clock signal CLKI1, the second internal clock signal CLKI2, the third internal clock signal CLKI3, the fourth internal clock signal CLKI3, the fourth internal clock signal CLKI4, and the fifth internal clock signal CLKI5 shown in FIG. 1.

According to other embodiments of the present invention, any of the first clock gating unit 131, the second clock gating unit 132, the third clock gating unit 133, the fourth clock gating unit 134, and the fifth clock gating units 135 shown in FIG. 1 may also be any other type of clock gating unit. The clock gating unit 200 in FIG. 2 and the clock gating unit 300 in FIG. 3 are illustrated for explanation, but they are not intended to be limited thereto.

Figure 4:
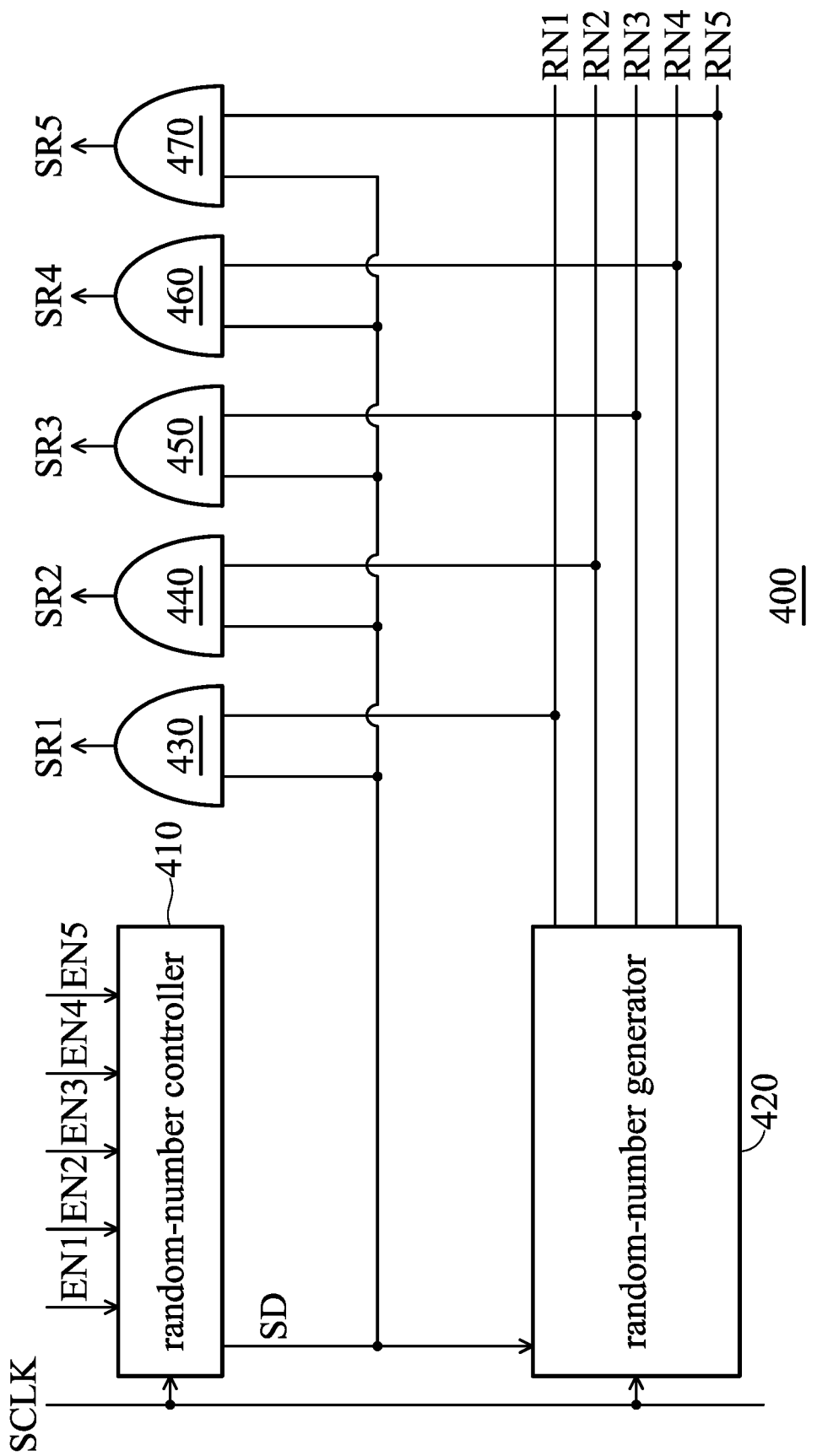
FIG. 4 is a block diagram illustrating a random-number controller in accordance with an embodiment of the present invention.

FIG. 4 is a block diagram illustrating a random-number controller in accordance with an embodiment of the present invention. As shown in FIG. 4, the random controller 400 includes a random-number controller 410, a random-number generator 420, a first AND gate 430, a second AND gate 440, a third AND gate 450, a fourth AND gate 460, and a fifth AND gate 470.

The random-number controller 410 is configured to determine whether any of the first enable signal EN1, the second enable signal EN2, the third enable signal EN3, the fourth enable signal EN4, and the fifth enable signal EN5 is at the first logic level. When any of the first enable signal EN1, the second enable signal EN2, the third enable signal EN3, the fourth enable signal EN4, and the fifth enable signal EN5 is at the first logic level, the random-number controller 410 generates a determination signal SD. According to an embodiment of the present invention, the first logic level is a high logic level.

The random-number generator 420 generates a first random number RN1, a second random number RN2, a third random number RN3, a fourth random number RN4, and a fifth random number RN5 according to the determination signal SD and the system clock signal SCLK. According to an embodiment of the present invention, the random-number generator 420 again generates a first random number RN1, a second random number RN2, a third random number RN3, a fourth random number RN4, and a fifth random number RN5 after the predetermined period. The predetermined period is an integer multiple of the period of the system clock signal SCLK.

The first AND gate 430 receives the determination signal SD and the first random number RN1, and performs a logical AND operation on the determination signal SD and the first random number RN1 to generate a first random signal SR1. The second AND gate 440 receives the determination signal SD and the second random number RN2, and performs a logical AND operation on the determination signal SD and the second random number RN2 to generate a second random signal SR2. The third AND gate 450 receives the determination signal SD and the third random number RN3, and performs a logical AND operation on the determination signal SD and the third random number RN3 to generate a third random signal SR3.

The fourth AND gate 460 receives the determination signal SD and the fourth random number RN4, and performs a logical AND operation on the determination signal SID and the fourth random number RN4 to generate a fourth random signal SR4. The fifth AND gate 470 receives the determination signal SD and the fifth random number RN5, and performs a logical AND operation on the determination signal SD and the fifth random number RN5 to generate a fifth random signal SR5.

According to an embodiment of the present invention, the first random number RN1, the second random number RN2, the third random number RN3, the fourth random number RN4, and the fifth random number RN5 are all controlled by the determination signal SD to be output as the first random signal SR1, the second random signal SR2, the third random signal SR3, the fourth random signal SR4, and the fifth random signal SR5, respectively. This can help to avoid an incorrect output of any of the first random number RN1, the second random number RN2, the random number RN3, the fourth random number RN4, and the fifth random number RN5, which would falsely enable the corresponding functional unit (i.e., the first functional unit 141, the second functional unit 142, the third functional unit 143, the fourth functional unit 144, and the fifth functional unit 145).

Figure 5:
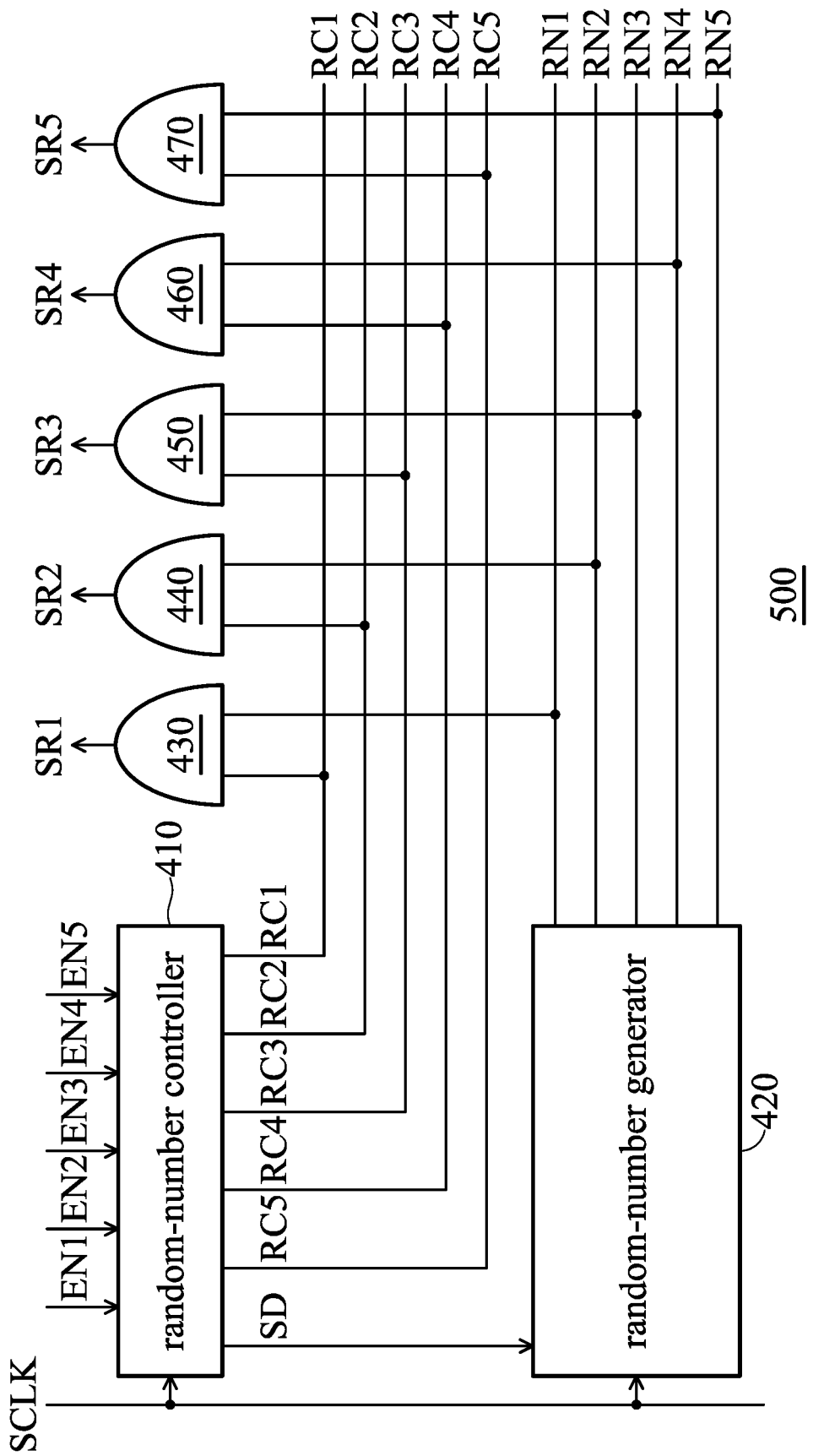
FIG. 5 is a block diagram illustrating a random-number controller in accordance with another embodiment of the present invention.

FIG. 5 is a block diagram illustrating a random-number controller in accordance with another embodiment of the present invention. Comparing the random-number controller 500 of FIG. 5 to the random controller 400 of FIG. 4, the random-number controller 410 further generates a first random-number control signal RC1, a second random-number control signal RC2, a third random-number control signal RC3, a fourth random-number control signal RC4, and a fifth random-number control signal RC5 that are respectively transmitted to the first AND gate 430, the second AND gate 440, the third AND gate 450, the fourth AND gate 460, and the fifth AND gate 470.

According to an embodiment of the present invention, the random-number controller 410 determines whether to output the random-number value generated by the random-number generator 420 as the corresponding first random signal SR1, second random signal SR2, third random signal SR3, fourth random signal SR4, and fifth random signal SR5 by the first random-number control signal RC1, the second random-number control signal RC2, the third random-number control signal RC3, the fourth random-number control signal RC4, and the fifth random-number control signal RC5, so as to randomly enable at least one of the first functional unit 141, the second functional unit 142, the third functional unit 143, the fourth functional unit 144, and the fifth functional unit 145. In other words, the random-number controller 410 determines whether any of the functional units (i.e., the first functional unit 141, the second functional unit 142, the third functional unit 143, the fourth functional unit 144, and the fifth functional unit 145) in FIG. 1 is randomly enabled by the first random-number control signal RC1, the second random-number control signal RC2, the third random-number control signal RC3, the fourth random-number control signal RC4, and the fifth random-number control signal RC5.

According to another embodiment of the present invention, the random-number controller 410 may incorporate the first random-number control signal RC1, the second random-number control signal RC2, the third random-number control signal RC3, and the fourth random-number control signal RC4, and the fifth random-number control signal RC5 with other algorithms, making it more difficult for an attacker to predict the random value of the first random signal SR1, the second random signal SR2, the third random signal SR3, the fourth random signal SR4, and the fifth random signal SR5.

Figure 6:
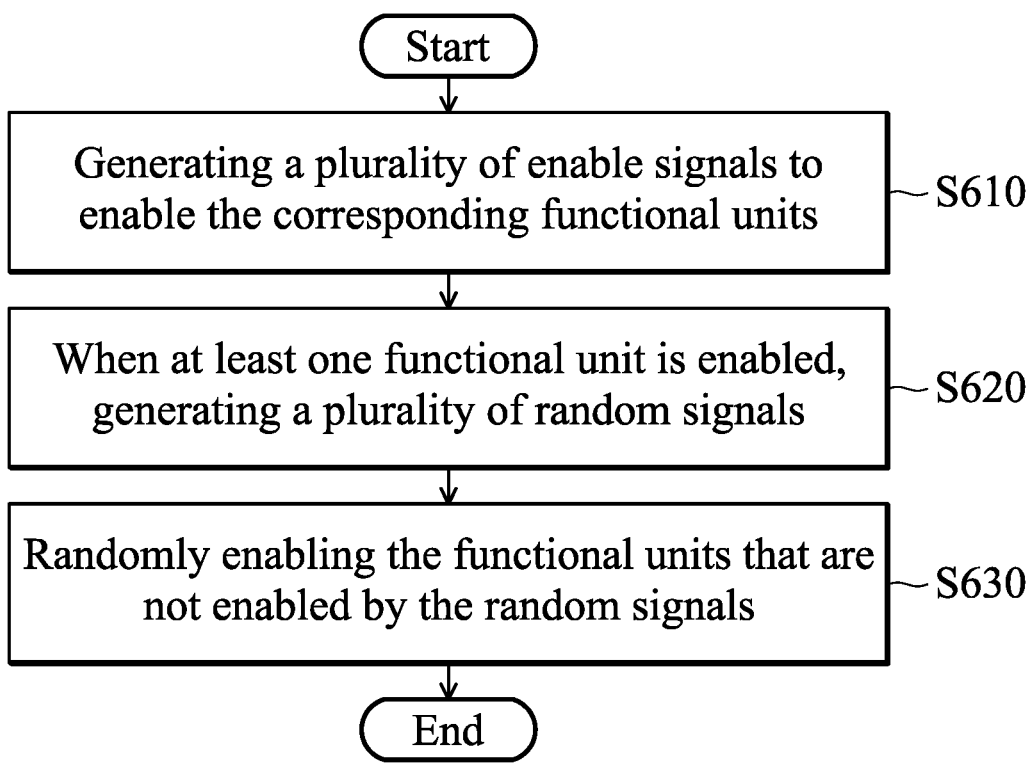
FIG. 6 is a flowchart illustrating an encryption method in accordance with an embodiment of the present invention.

FIG. 6 is a flowchart illustrating an encryption method in accordance with an embodiment of the present invention. The following description of the encryption method 600 will be described with reference to FIG. 1 for detailed explanation. First, the controller 110 is utilized to generate at least one of a first enable signal EN1, a second enable signal EN2, a third enable signal EN3, a fourth enable signal EN4, and a fifth enable signal EN5 in the first logic level, so that the corresponding first functional unit 141, second functional unit 142, third functional unit 143, fourth functional unit 144, or fifth functional unit 145 is enabled (Step S610).

When at least one of the first enable signal EN1, the second enable signal EN2, the third enable signal EN3, the fourth enable signal EN4, and the fifth enable signal EN5 is at the first logic level, the random controller 120 is utilized to generate a first random signal SR1, a second random signal SR2, a third random signal SR3, a fourth random signal SR4, and a fifth random signal SR5 (Step S620).

The first random signal SR1, the second random signal SR2, the third random signal SR3, the fourth random signal SR4, and the fifth random signal SR5 are utilized to randomly enable at least one of the first functional unit 141, the second functional unit 142, the third functional unit 143, the fourth functional unit 144, and the fifth functional unit 145 that are not enabled yet (Step S630) to disturb the power traces of the encryption device 100.

For example, Step S610 enables the first functional unit 141 by using the first enable signal EN1. In Step S620, the random controller 120 generates the first random signal SR1, the second random signal SR2, the third random signal SR3, the fourth random signal SR4, and the fifth random signal SR5 according to the first enable signal EN1 in the first logic level. Next, in step S630, the second random signal SR2, the third random signal SR3, the fourth random signal SR4, and the fifth random signal SR5 are utilized to randomly enable at least one of the second functional unit 142, the third functional unit 143, the fourth functional unit 144. and the fifth functional unit 145 that are not enabled yet. According to an embodiment of the present invention, the random controller 120 may update the random values of the first random signal SR1, the second random signal SR2, the third random signal SR3, the fourth random signal SR4, and the fifth random signal SR5 after each predetermined period, where the predetermined period is an integer multiple of the period of the system clock signal SCLK.

The present invention provides an encryption device and an encryption method. By using a clock gating unit and a method of random number generation, any functional units that are not performing operations are randomly enabled, thereby disturbing the power traces of the encryption device. Furthermore, the encryption device and the encryption method provided by the present invention are very simple and can be realized without a background in cryptography. In addition, when the power traces of an encryption device need to be increased, the original functional unit can be subdivided into several smaller hardware modules that can be individually inserted into the clock gating unit, so that the complexity of the power traces may be easily improved. On the whole, the encryption device and encryption method provided by the present invention may achieve the possibility of more power traces to improve the security of encryption with a minimal cost.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An encryption device, comprising:
    a controller, configured to generate a first enable signal and a second enable signal;
    a random controller, wherein when at least one of the first enable signal and the second enable signal is at a first logic level, the random controller generates a first random signal and a second random signal;
    a first functional unit, performing a corresponding operation according to the first enable signal and the first random signal; and
    a second functional unit, performing a corresponding operation according to the second enable signal and the second random signal;
    wherein when the first functional unit is enabled according to the first enable signal, the second functional unit is randomly enabled according to the second random signal, thereby disturbing power traces of the encryption device.

2. The encryption device as defined in claim 1, further comprising:
    a first clock gating unit, generating a first internal clock signal according to the first enable signal, the first random signal, and a system clock signal, wherein the first functional unit further performs the corresponding operation according to the first internal clock signal; and
    a second clock gating unit, generating a second internal clock signal according to the second enable signal, the second random signal, and the system clock signal, wherein the second functional unit further performs the corresponding operation according to the second internal clock signal.

3. The encryption device as defined in claim 1, further comprising:
    a third clock gating unit, generating a third internal clock signal according to a third enable signal, a third random signal, and the system clock signal; and
    a third functional unit, performing a corresponding operation according to the third internal clock signal, wherein the controller is further configured to generate the third enable signal, wherein when at least one of the first enable signal, the second enable signal, and the third enable signal is at the first logic level, the random controller generates the first random signal, the second random signal, and the third random signal.

4. The encryption device as defined in claim 3, wherein when the first enable signal is at the first logic level, the first functional unit is enabled to perform the corresponding operation and the random controller generates the first random signal, the second random signal, and the third random signal, so that the second functional unit and the third functional unit are randomly enabled according to the second random signal and the third random signal respectively to disturb a power trace of the encryption device.

5. The encryption device as defined in claim 3, wherein each of the first clock gating unit, the second clock gating unit, and the third clock gating unit comprises:
    an OR gate, receiving an enable signal and a random signal to generate a logic signal; and
    an AND gate, outputting the system clock signal as an internal clock signal according to the logic signal.

6. The encryption device as defined in claim 3, wherein the random controller comprises:

a random-number controller, determining whether any of
the first enable signal, the second enable signal, and the
third enable signal is at the first logic level, wherein
when any of the first enable signal, the second enable
signal, and the third enable signal is at the first logic
level, the random-number controller generates a determination signal; and a random-number generator, generating a first random
number, a second random number, and a third random
number according to the determination signal and the
system clock signal.

7. The encryption device as defined in claim 6, wherein the random-number generator again generates the first random number, the second random number, and the third random number after a predetermined period, wherein the predetermined period is an integer multiple of the period of the system clock signal.

8. The encryption device as defined in claim 6, wherein the random controller further comprises:
    a first AND gate, receiving the determination signal and the first random number to generate the first random signal;
    a second AND gate, receiving the determination signal and the second random number to generate the second random signal; and
    a third AND gate, receiving the determination signal and the third random number to generate the third random signal.

9. The encryption device as defined in claim 6, wherein the random controller further comprises:
    a first AND gate, receiving a first random-number control signal and the first random number to generate the first random signal;
    a second AND gate, receiving a second random-number control signal and the second random number to generate the second random signal; and
    a third AND gate, receiving a third random-number control signal and the third random number to generate the third random signal, wherein the random-number controller further generates the first random-number control signal, the second random-number control signal, and the third random-number control signal to control whether to output any of the first random number, the second random number, and the third random number.

10. An encryption method, adapted to an encryption device, wherein the encryption device comprises a first functional unit, a second functional unit, and a third functional unit, wherein the encryption method comprises:
    generating a first enable signal to enable the first functional unit, wherein the first enable signal is at a first logic level;
    generating a first random signal, a second random signal, and a third random signal according to the first enable signal at the first logic level; and
    randomly enabling the second functional unit by the second random signal and the third functional unit by the third random signal, thereby disturbing power traces of the encryption device.

11. The encryption method as defined in claim 10, wherein the encryption device further comprises a first clock gating unit and a second clock gating unit, wherein the encryption method further comprises:
    generating a first internal clock signal according to the first enable signal, the first random signal, and a system clock signal by using the first clock gating unit;
    enabling the first functional unit by using the first internal clock signal;
    generating a second internal clock signal according to a second enable signal, the second random signal, and the system clock signal by using the second clock gating unit; and
    enabling the second functional unit by using the second internal clock signal.

12. The encryption method as defined in claim 11, wherein the encryption device further comprises a third clock gating unit, wherein the encryption method further comprises:
    generating a third internal clock signal according to a third enable signal, the third random signal, and the system clock signal by using the third clock gating unit; and
    enabling the third functional unit by using the third internal clock signal.

13. The encryption method as defined in claim 12, wherein the step of generating the first internal clock signal according to the first enable signal, the first random signal, and the system clock signal by using the first clock gating unit, the step of generating the second internal clock signal according to the second enable signal, the second random signal, and the system clock signal by using the second clock gating unit, and the step of generating the third internal clock signal according to the third enable signal, the third random signal, and the system clock signal by using the third clock gating unit each further comprises:
    performing a logic OR operation on an enable signal and a random signal to generate a logic signal;
    outputting the system clock signal as an internal clock signal according to the logic signal; and
    enabling a corresponding functional unit according to the internal clock signal.

14. The encryption method as defined in claim 12, wherein the step of generating the first random signal, the second random signal, and the third random signal according to the first enable signal at the first logic level further comprises:
    when any of the first enable signal, the second enable signal, and the third enable signal is at the first logic level, generating a determination signal by using a random-number controller; and
    generating a first random number, a second random number, and a third random number according to the determination signal and the system clock signal.

15. The encryption method as defined in claim 14, wherein the first random number, the second random number, and the third random number are generated again after the predetermined period, wherein the predetermined period is an integer multiple of a period of the system clock signal.

16. The encryption method as defined in claim 14, wherein the step of generating the first random signal, the second random signal, and the third random signal according to the determination signal and the system clock signal further comprises:
    performing a logic AND operation on the determination signal and the first random number to generate the first random signal;
    performing the logic AND operation on the determination signal and the second random number to generate the second random signal; and
    performing the logic AND operation on the determination signal and the third random number to generate the third random signal.

17. The encryption method as defined in claim 12, wherein the step of generating the first random signal, the second random signal, and the third random signal according to the determination signal and the system clock signal further comprises:

generating a first random-number control signal, a second random-number control signal, and a third random-number control signal by using a random-number controller;

performing a logic AND operation on the first random-number control signal and the first random number to generate the first random signal;

performing the logic AND operation on the second random-number control signal and the second random number to generate the second random signal; and performing the logic AND operation on the third random-number control signal and the third random number to generate the third random signal.

\* \* \* \* \*